US012637872B2

(12) United States Patent
Besnier et al.

(10) Patent No.: US 12,637,872 B2
(45) Date of Patent: May 26, 2026

(54) AUTOMATIC SWIMMING POOL CLEANERS WITH BYPASS MECHANISMS

(71) Applicant: ZODIAC POOL CARE EUROPE, Belberaud (FR)

(72) Inventors: Arnaud Besnier, Beaupuy (FR); Louis Favie, Colomiers (FR)

(73) Assignee: ZODIAC POOL CARE EUROPE, Belberaud (FR)

( * ) Notice: Subject to any disclaimer, the term of this patent is extended or adjusted under 35 U.S.C. 154(b) by 525 days.

(21) Appl. No.: 17/498,838

(22) Filed: Oct. 12, 2021

(65) Prior Publication Data

US 2022/0112735 A1 Apr. 14, 2022

Related U.S. Application Data

(60) Provisional application No. 63/137,356, filed on Jan. 14, 2021, provisional application No. 63/091,110, filed on Oct. 13, 2020.

(51) Int. Cl.
*E04H 4/16* (2006.01)
*C02F 1/00* (2023.01)
*C02F 103/42* (2006.01)

(52) U.S. Cl.
CPC ........... *E04H 4/1654* (2013.01); *C02F 1/001* (2013.01); *C02F 2103/42* (2013.01); *C02F 2201/005* (2013.01); *C02F 2201/008* (2013.01)

(58) Field of Classification Search
CPC ....... E04H 4/1654; E04H 4/1663; E04H 4/16; C02F 1/001; C02F 2103/42; C02F 2201/005; C02F 2201/008
See application file for complete search history.

(56) References Cited

U.S. PATENT DOCUMENTS

| | | | | |
|---|---|---|---|---|
| 5,265,297 A | * | 11/1993 | Gould | E04H 4/1663 |
| | | | | 285/318 |
| 5,904,171 A | * | 5/1999 | Stahle | E04H 4/1645 |
| | | | | 137/907 |
| 6,473,928 B1 | * | 11/2002 | Veloskey | E04H 4/1663 |
| | | | | 210/167.16 |
| 2008/0235887 A1 | * | 10/2008 | Horvath | E04H 4/1654 |
| | | | | 15/1.7 |

(Continued)

FOREIGN PATENT DOCUMENTS

| | | | | |
|---|---|---|---|---|
| CN | 101033650 A | * | 9/2007 | ........... E04H 4/1654 |
| EP | 2845969 | | 3/2015 | |

(Continued)

OTHER PUBLICATIONS

Opposition to EP 2845969 B1 (Year: 2017).*

(Continued)

*Primary Examiner* — David S Posigian
*Assistant Examiner* — Steven Huang
(74) *Attorney, Agent, or Firm* — Kilpatrick Townsened & Stockton LLP

(57) ABSTRACT

Bypass mechanisms especially useful for automatic swimming pool cleaners are described. Such a mechanism may facilitate climbing of generally vertical walls by the cleaners. When a cleaner is to be extracted from a swimming pool, the mechanism additionally may assist in draining water from within the body of the cleaner to facilitate extraction.

20 Claims, 6 Drawing Sheets

(56)                    References Cited

U.S. PATENT DOCUMENTS

| | | | | |
|---|---|---|---|---|
| 2012/0060307 A1* | 3/2012 | Stoltz | E04H 4/1654 | 15/1.7 |
| 2012/0305463 A1* | 12/2012 | Hui | E04H 4/1654 | 210/167.17 |
| 2014/0230168 A1* | 8/2014 | Ben Dov | E04H 4/1654 | 15/1.7 |
| 2015/0067974 A1* | 3/2015 | Ben Dov | E04H 4/1663 | 15/1.7 |
| 2016/0145885 A1* | 5/2016 | Hui | E04H 4/1663 | 210/138 |
| 2018/0283029 A1* | 10/2018 | Tailleur | B08B 3/14 | |
| 2019/0360226 A1 | 11/2019 | Schloss | | |

FOREIGN PATENT DOCUMENTS

| | | | | |
|---|---|---|---|---|
| EP | 3023561 A1 * | 5/2016 | | E04H 4/1654 |
| EP | 2845969 B1 * | 9/2016 | | E04H 4/1654 |
| WO | WO-2014128531 A1 * | 8/2014 | | E04H 4/1663 |
| ZA | 200105424 A * | 4/2002 | | |

OTHER PUBLICATIONS

Translation of CN 101033650 A (Year: 2007).*

International Application No. PCT/IB2021/059343, Invitation to Pay Additional Fees and, Where Applicable, Protest Fee mailed on Jan. 19, 2022, 6 pages.

International Application No. PCT/IB2021/059343, International Preliminary Report on Patentability mailed on Apr. 27, 2023, 12 pages.

International Application No. PCT/IB2021/059343, International Search Report and Written Opinion mailed on Mar. 15, 2022, 17 pages.

European Application No. 21798117.4, Office Action mailed on Dec. 20, 2024, 6 pages.

* cited by examiner

AUTOMATIC SWIMMING POOL CLEANERS WITH BYPASS MECHANISMS

REFERENCE TO RELATED APPLICATIONS

This application claims the benefit of U.S. Provisional Patent Application No. 63/091,110, filed on Oct. 13, 2020, and entitled AUTOMATIC SWIMMING POOL CLEANERS WITH BYPASS MECHANISMS, and the benefit of U.S. Provisional Patent Application No. 63/137,356, filed on Jan. 14, 2021, and entitled AUTOMATIC SWIMMING POOL CLEANERS WITH BYPASS MECHANISMS, both of which are hereby incorporated by reference in their entireties.

FIELD OF THE INVENTION

This application relates to systems and apparatuses for cleaning water-containing vessels such as swimming pools and spas, and, more particularly, although not necessarily exclusively, to automatic swimming pool cleaners (APCs) with bypass mechanisms useful especially for enhancing climbing ability of the APCs and facilitating extraction of the APCs from pools.

BACKGROUND

Numerous cleaning devices capable of autonomous movement within swimming pools and spas currently exist. The most common of these devices are APCs, which often are either hydraulic or robotic in type. Hydraulic cleaners vary water flow for movement, while robotic cleaners typically employ electric motors to cause motion. Hydraulic APCs, furthermore, subdivide into "pressure-side" and "suction-side" cleaners, with pressure-side cleaners being fluidly connected to outputs of pumps of pool water circulation systems and suction-side cleaners being fluidly connected to inputs of such pumps.

Water vacuumed into suction-side cleaners typically is filtered remotely. By contrast, robotic and pressure-side APCs usually include on-board filtration, with a filter carried on, in, or with an associated body of an APC as the body moves within a pool. At times, a clogged filter can inhibit water flow through an APC, impeding the ability of an APC to climb a generally vertical wall of a swimming pool, for example. By passes thus have been contemplated that would redirect water away from the (clogged) filter before exiting the APC.

Also challenging for some consumers is removing an APC from a swimming pool when its presence in the pool is unwanted or unneeded. This challenge exists, at least in part, because an APC typically fills with water when submerged and thus is relatively heavy when removed from the water of the pool. Desirable, therefore, would be creation of a bypass mechanism that addresses both issues—i.e., it enhances climbing ability of an APC within a pool and aids a human user in removing the APC from the pool.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, an APC includes a bypass mechanism that selectively opens or closes based on whether the APC is, or is not, attempting to climb a generally vertical surface of a pool and/or whether a pump of the APC is, or is not, operating.

According to some embodiments, an APC includes a body having an inlet, an outlet, and a bypass opening. The APC may include a bypass mechanism having a positioning mechanism (e.g., a float, weight, spring, magnet, etc.), and the bypass mechanism opens and closes the bypass opening based, at least in part, on an orientation of the body.

According to various embodiments, an APC includes a body having a water inlet, a water outlet, and a bypass opening. The APC also optionally includes one or more motive elements, a filter positioned at least partially in the body, a pump positioned at least partially in the body, and a bypass mechanism. The bypass mechanism includes a positioning mechanism connected to a biasing member, such as a torsion spring, and is moveable between a first position closing the bypass opening and a second position opening the bypass opening. In various aspects, the orientation of the body and the operational status of the pump may determine whether the bypass mechanism is in the first position or the second position.

According to certain embodiments, a method of extracting an APC from a swimming pool includes causing the APC to climb a generally vertical wall of the swimming pool toward its waterline, thereby opening a bypass opening in a body of the automatic swimming pool cleaner. The method may include causing the de-energization of a pump of the APC with the bypass opening remaining open to allow water within the body to drain therefrom.

According to some embodiments, an APC includes a bypass opening for a fluid and a bypass mechanism that may selectively open or close the bypass opening based on an orientation of the automatic swimming pool cleaner and/or based on an operational status of a pump of the APC.

According to certain embodiments, an APC includes a body having a fluid inlet, a fluid outlet, and a bypass opening. The APC also includes a bypass mechanism having an positioning mechanism. The bypass mechanism may selectively open and close the bypass opening based on an orientation of the body.

According to various embodiments, an APC includes a body having a fluid inlet, a fluid outlet, and a bypass opening. The APC also includes a pump positioned at least partially in the body, and a bypass mechanism having a positioning mechanism. In one non-limiting example, the positioning mechanism may be a float. The bypass mechanism tray selectively open and close the bypass opening based on an operational status of the pump.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. References to "pools" and "swimming pools" herein may also refer to spas or other water containing vessels or structures used for recreation or therapy. As used herein, a wall or surface is generally vertical if it extends at an angle that is closer to vertical than to horizontal, and conversely is generally horizontal if it extends at an angle that is closer to horizontal than to vertical.

Described herein are bypass mechanisms for swimming pool cleaners, as well as automatic pool cleaners (APCs) and associated methods utilizing such bypass mechanisms. In certain embodiments, the bypass mechanism may selectively open or close a bypass fluid inlet of the APC based on at least one of an orientation of the APC or an operational status of a pump of the APC. In various aspects, the bypass mechanism may allow the APC to climb a wall or generally vertical surface of a swimming pool regardless of a status of a pump of the APC. Additionally or alternatively, the bypass mechanism may facilitate and accelerate drainage of water from the APC, which in turn may facilitate extraction of the APC from the swimming pool by a user. Various other benefits and advantages may be realized with the bypass mechanism described herein, and the aforementioned advantages and benefits should not be considered limiting.

Figure 1A:
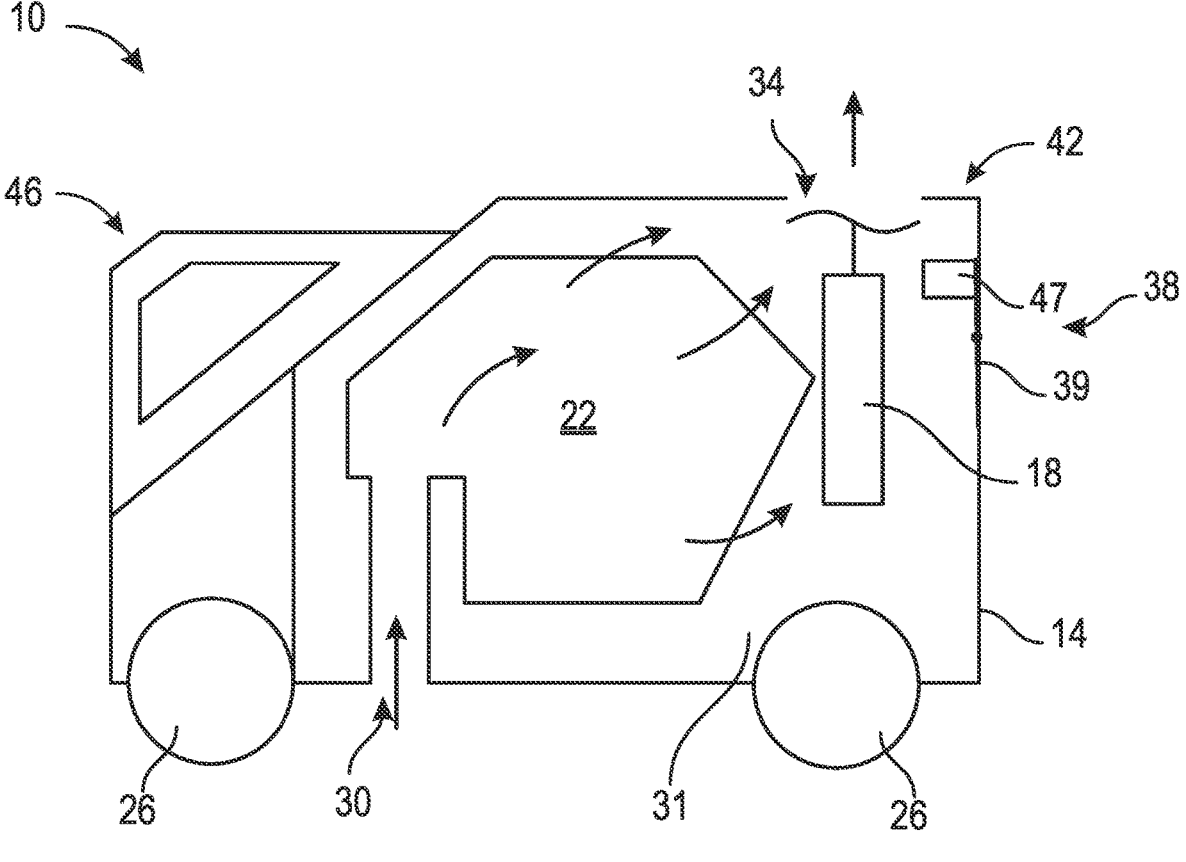
FIG. 1A illustrates an APC with a bypass mechanism according to certain embodiments.
Figure 1C:
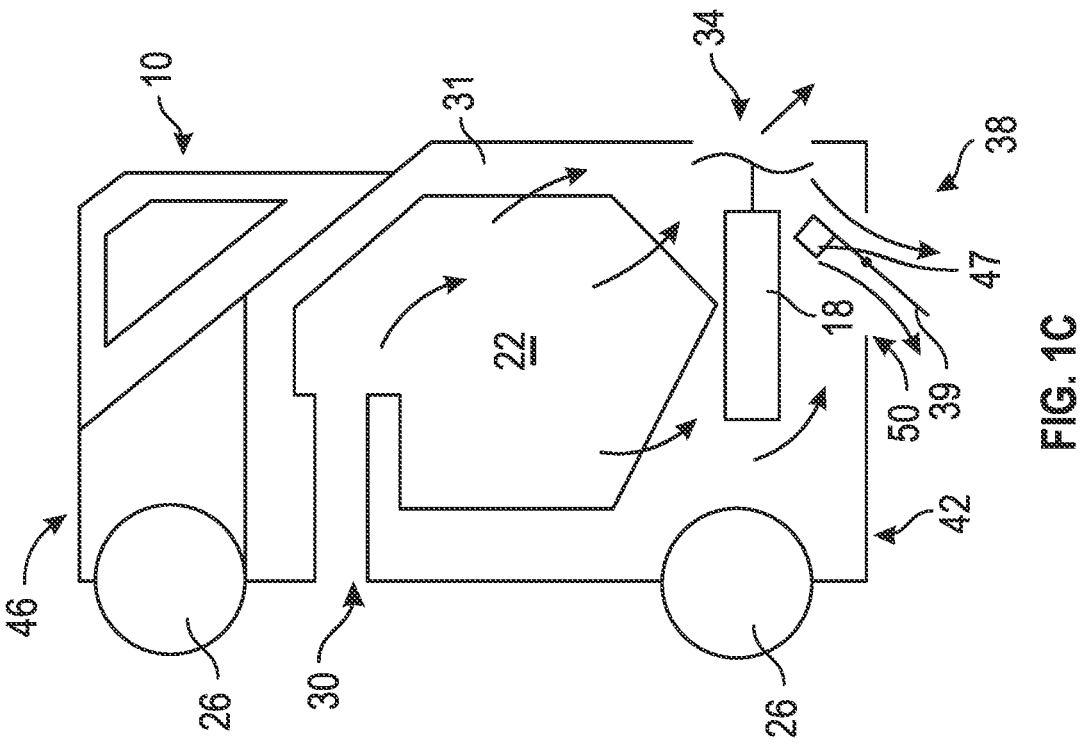
FIG. 1C illustrates the APC of FIG. 1A having the orientation illustrated in FIG. 1B and with a pump having an operational status different from that illustrated in FIG. 1B.
Figure 1B:
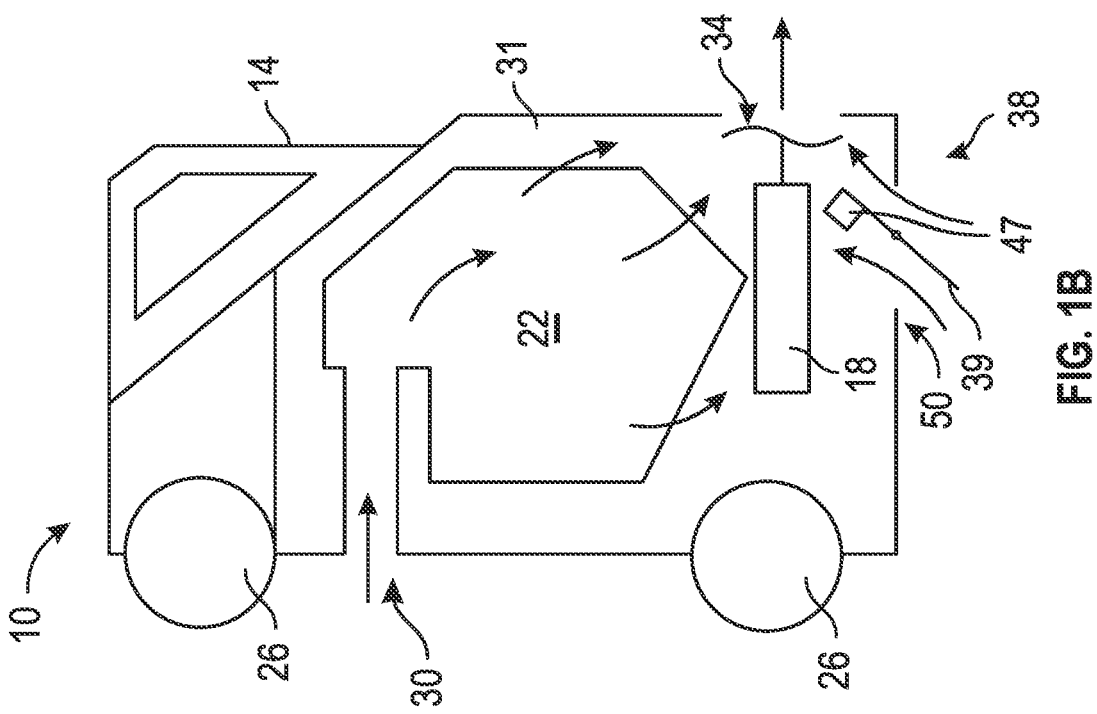
FIG. 1B illustrates the APC of FIG. 1A having an orientation different from the orientation illustrated in FIG. 1A.

FIGS. 1A-1C illustrate an example of an APC 10 that includes a bypass mechanism 38 according to various embodiments.

In certain embodiments, the APC 10 includes a body 14 generally having a front region 46, which may be presented to the user during extraction (discussed below) and a rear region 42 opposite from the front region 46. The body 14 of the APC 10 includes a fluid inlet 30 and a fluid outlet 34, and a fluid flow path (e.g., for water from a swimming pool) is defined through an interior 31 of the APC 10 from the fluid inlet 30 to the fluid outlet 34. As illustrated in FIGS. 1A-1C, a pump 18 (and associated electric motor) and/or a filter 22 may optionally be provided at least partially within the interior 31 of the APC 10. Absent activation or inclusion of the bypass mechanism 38, operation of the pump 18 would evacuate debris-laden pool water from the pool and into the inlet 30. The water thereafter would travel through the filter 22, where much of the debris would be deposited, before exiting the body 14 through the outlet 34 for return to the pool.

Optionally, one or more motive elements 26 are provided with the APC 10 to facilitate movement of the APC 10. In the embodiment illustrated, the motive elements 26 include wheels, although in other embodiments other types and/or combinations of motive elements may be utilized as desired. In some embodiments, the APC 10 optionally includes a controller, which may include at least one processor and/or at least one memory and/or be various suitable types of computing devices or systems. Means for sensing and/or receiving one or more inputs may also be provided on the APC 10, including but not limited to various sensors, antennas, communication modules, and/or other mechanisms as desired. In certain embodiments, the controller may be communicatively coupled with various components of the APC 10 and may selectively control features of the APC 10 as desired. As some non-limiting examples, the controller may selectively control the biasing mechanism 38, the motive elements 26, the motor, and/or the pump 18 based on an input received from a user. In one non-limiting example, the bypass mechanism 38 may be indirectly controlled by the controller and/or user by managing at least one aspect of power supplied to the pump 18, including but not limited to an amount of power, pattern of power (e.g., to generate pulses), a duration of power, etc.

In various embodiments, the APC 10 includes a bypass opening 50, and the bypass mechanism 38 may selectively open and close the bypass opening 50 (e.g., by blocking or unblocking the bypass opening 50) such that water can selectively flow through the bypass opening 50. As discussed in detail below, the bypass opening 50 may function as an inlet or an outlet depending on one or more operating conditions of the APC 10. In certain embodiments, when the bypass opening 50 is open and functioning as an inlet, a bypass fluid flow path may be defined from the bypass opening 50 into the interior 31, where it may join with the flow path from the fluid inlet 30 to the fluid outlet 34. Conversely, when the bypass opening 50 is open and functioning as an outlet (e.g., when water is draining out of the APC 10), a bypass fluid flow path may be defined from the interior 31 to the bypass opening 50 such that the bypass opening 50 functions as a drainage/exhaust outlet.

In various aspects, the bypass mechanism 38 may optionally include a blocking device 39 that is movably supported on or connected to the body 14 such that the blocking device 39 is movable relative to the body 14 between a first position and a second position. In the first position, the blocking device 39 may close the bypass opening 50, and in the second position, the blocking device 39 may open the bypass opening 50. Optionally, the bypass mechanism 38 includes a biasing member or device that biases the blocking device 39 towards the first position or the second position. The blocking device 39 may be movably supported on or connected to the body 14 using various suitable devices or mechanisms as desired. In the embodiments illustrated, the blocking device 39 is pivotable relative to the body 14 about a horizontal or lateral axis relative to the body 14. In other embodiments, the blocking device 39 may be pivotable about a vertical or longitudinal axis relative to the body 14, hinged relative to the body, or otherwise connected as desired.

Optionally, the bypass mechanism 38 includes a positioning mechanism 47 connected to the blocking device 39. When included, the positioning mechanism 47 may facilitate positioning of the blocking device 39 between the first position and the second position. Optionally, the positioning mechanism 47 may bias the blocking device 39 towards a particular position based on an orientation of the body 14, although it need not in other embodiments. In the embodiment illustrated, the positioning mechanism is a float; however, in other embodiments, other types of positioning mechanisms may be included as desired, and as such the particular positioning mechanism 47 illustrated should not be considered limiting. As some non-limiting examples, in other optional embodiments, the positioning mechanism may include a weight, a spring, a magnet, combinations thereof, and/or other suitable mechanisms as desired.

The particular location of the bypass opening 50 and the bypass mechanism 38 illustrated in FIGS. 1A-1C should not be considered limiting and the bypass opening 50 may be provided at various locations on the body 14 as desired. In certain examples, providing the bypass opening 50 in the rear region 42 of the body 14 may be beneficial and facilitate drainage of water from within the APC 10 through the bypass opening 50 in certain operating conditions. The particular APC 10 illustrated in FIGS. 1A-1C should not be considered limiting, and in other embodiments, an APC that includes the bypass mechanism 38 may include other structures, features, components, etc. as desired.

The bypass mechanism 38 may function dependent on one or more operating conditions of the APC 10. In certain embodiments, the bypass mechanism 38 may function dependent on one or more of (1) whether the APC 10 is, or is not, attempting to climb a generally vertical surface of a pool and/or (2) whether the pump 18 of the APC 10 is, or is not, operating. Four non-limiting examples illustrating control and adjustment of the bypass mechanism 38 are discussed below, although the bypass mechanism 38 may be controlled to be open or closed based on other operating conditions of the APC 10 as desired.

In a first non-limiting example, and referring to FIG. 1A, if the APC 10 has an operating condition where it is moving along a generally horizontal surface (or conversely, not climbing a generally vertical surface) within a swimming pool and the pump 18 is operating (energized), the bypass mechanism 38 may be closed such that the bypass mechanism 38 obstructs and/or otherwise prevent or minimizes the flow of water through the bypass opening 50. In certain embodiments, such a condition may represent a "normal" condition of the APC actively cleaning, e.g., a pool floor. In this example, closing the bypass mechanism 38 may allow for maximum suction to draw debris-laden pool water into the APC 10 for deposit of the debris into its on-board filter 22.

In a second non-limiting example, if the APC 10 has an operating condition where it is moving along a generally horizontal surface (or conversely, not climbing a generally vertical surface) within a swimming pool and its pump 18 is not operating (de-energized), the bypass mechanism 38 may be open such that the bypass mechanism 38 does not obstruct the bypass opening 50 and/or otherwise allows for water to flow through the bypass opening 50. In some cases, such an operating condition may represent an "inactive" condition of the APC within the pool. In other embodiments, in the "inactive" condition, the APC 10 may be stationary on the generally horizontal surface. In other alternative embodiments, if the APC 10 is on a generally horizontal surface (moving or stationary) and/or the pump 18 is not operating, the bypass mechanism 38 may be closed.

In a third non-limiting example, and referring to FIG. 1B, if the APC 10 has an operating condition where the APC 10 is climbing a generally vertical surface within a swimming pool and/or its pump 18 is operating, the bypass mechanism 38 may be open such that the bypass mechanism 38 does not obstruct the bypass opening 50 and/or otherwise allows for water to flow through the bypass opening 50. In some cases, this operating condition may represent a situation in which the APC 10 may require maximum flow of water through it for motive ("downforce") purposes to allow the APC 10 to reach the pool waterline. In certain embodiments, and as represented by the arrows in FIG. 1B, the bypass mechanism 38 open may function as a fluid inlet to the body 14 and may allow for water to flow through the bypass opening 50, into the interior 31, and out the fluid outlet 34 to provide maximum fluid flow through the APC 10. In this operating condition, the open bypass mechanism 38 may allow water to bypass the filter 22 (e.g., to maximize fluid flow through the APC 10), and low or no flow of water may be provided through the filter 22. Additionally or alternatively, the open bypass mechanism 38 in this operating condition may allow for flow through the APC 10 even if the filter is clogged, which would otherwise prevent such an operation.

In a fourth non-limiting example, and referring to FIG. 1C, if the APC 10 has an operating condition where it is (or has just completed) climbing a generally vertical surface within a swimming pool and/or its pump 18 is not operating, the bypass mechanism 38 may be open such that the bypass mechanism 38 does not obstruct the bypass opening 50 and/or otherwise allows for water to flow through the bypass opening 50 (represented by the arrows in FIG. 1C). Such an operating condition may correspond to when a user might be attempting to extract the APC 10 from the pool, and the bypass mechanism 38 in the open position may accelerate water extraction from the body 14 by enabling water to flow out of both the fluid outlet 34 and the bypass opening 50. In this embodiment, the bypass opening 50 may function as a fluid outlet of the body 14.

As mentioned, the aforementioned examples are provided for illustrative purposes only, and other operating conditions may exist in which the bypass mechanism 38 is open or closed.

Figure 2A:
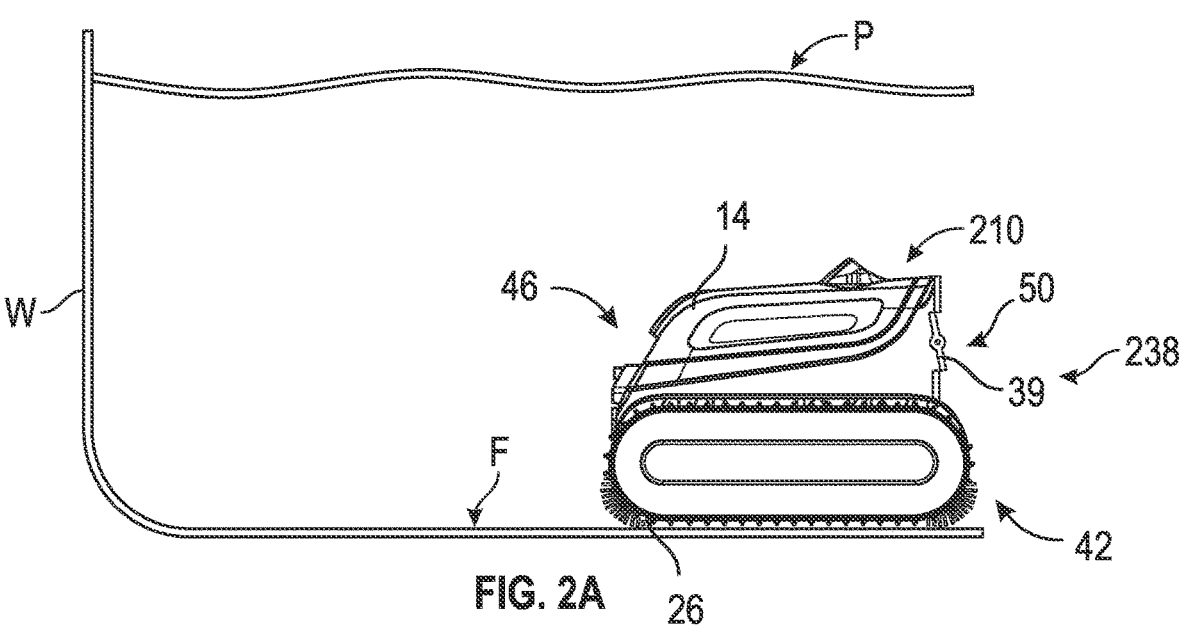
FIG. 2A illustrates an APC including a bypass mechanism within a swimming pool according to certain embodiments.
Figure 2B:
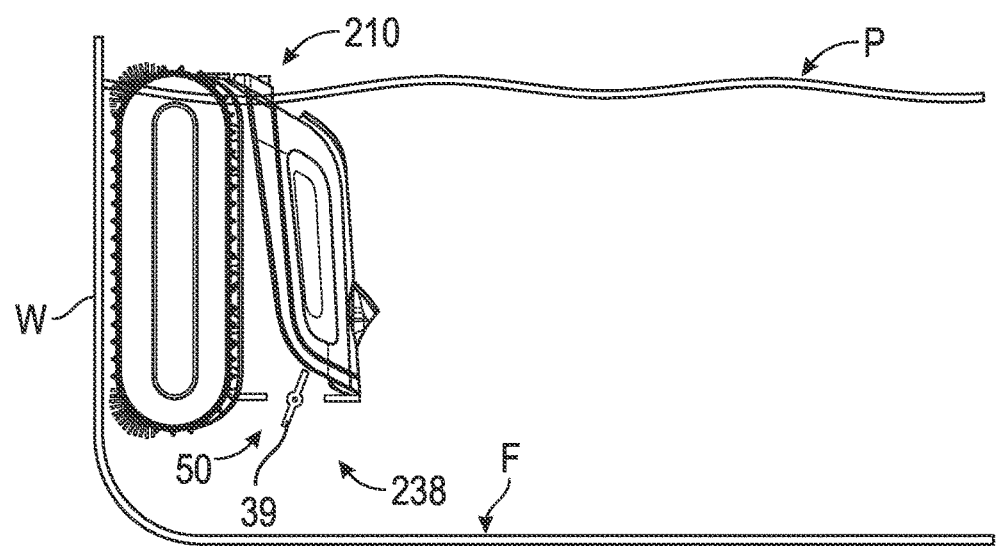
FIG. 2B illustrates the APC of FIG. 2A climbing a substantially vertical wall of the swimming pool.
Figure 2C:
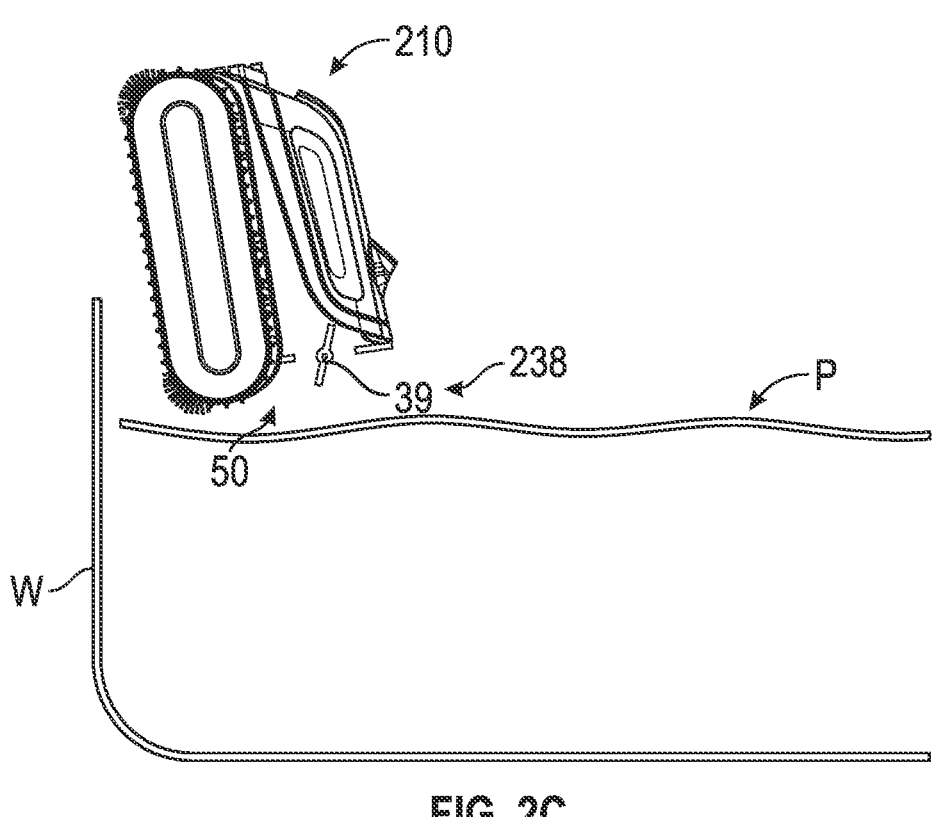
FIG. 2C illustrates the APC of FIG. 2A being removed from the swimming pool.

FIGS. 2A-2C illustrate another example of an APC 210 according to various embodiments. The APC 210 is similar to the APC 10 and includes a bypass mechanism 238. In FIGS. 2A-2C, the positioning of the bypass mechanism 238 is schematically represented separate from the body 14 for clarity, but the bypass mechanism 238 would be provided on the body 14 of the APC 210 similar to the bypass mechanism 38 on the APC 10. Compared to the APC 10, the body 14 of the APC 210 has a different shape and/or profile, and the motive elements 26 include tracks rather than wheels. The bypass mechanism 238 is substantially similar to the bypass mechanism 38 except that the positioning mechanism 47 is omitted from the bypass mechanism 238

FIG. 2A illustrates the APC 210 within a swimming pool P and travelling along a generally horizontal floor F of the swimming pool P. In this embodiment, a pump of the APC 210 is also operational and pumping water through APC 210. As illustrated in FIG. 2A, in this operating condition, the bypass mechanism 238 may be closed or substantially closed to prevent or minimize the flow of water through the bypass opening 50 of the APC 210. In this certain aspects, this operating condition may correspond with the "normal" condition of the APC 210 where it is actively cleaning the swimming pool P and a maximum suction force is needed.

By contrast, FIG. 2B depicts the APC 210 moving along a generally vertical wall W of the swimming pool P and with the pump of the APC 210 on. In this operating condition, the bypass mechanism 238 may be open, and water may be pulled in through the bypass opening 50 such that at least some of the water flowing through the APC 210 may bypass the filter of the APC 210 for maximum flow through the APC 210. Opening the bypass mechanism 238 in this operating condition may permit at least some water evacuated into the body 14 of the APC 210 to exit essentially directly through the outlet 34 (e.g., without passing through the filter), thus providing (or enhancing) a force tending to press the APC 10 onto the generally vertical wall W.

FIG. 2C depicts the APC 210 being removed from the swimming pool P, and the APC 210 has a generally vertical orientation. In this operating condition, the bypass mechanism 238 may be open. Hence, when the pump 18 is deactivated, the open bypass mechanism 238 can serve as an outlet by which water is drained from within the body 14. In this respect, positioning the bypass mechanism 238 in the rear region 42 of the body 14 (i.e., the region opposite the front region 46 presented to the user for extraction) may be beneficial.

Figure 3:
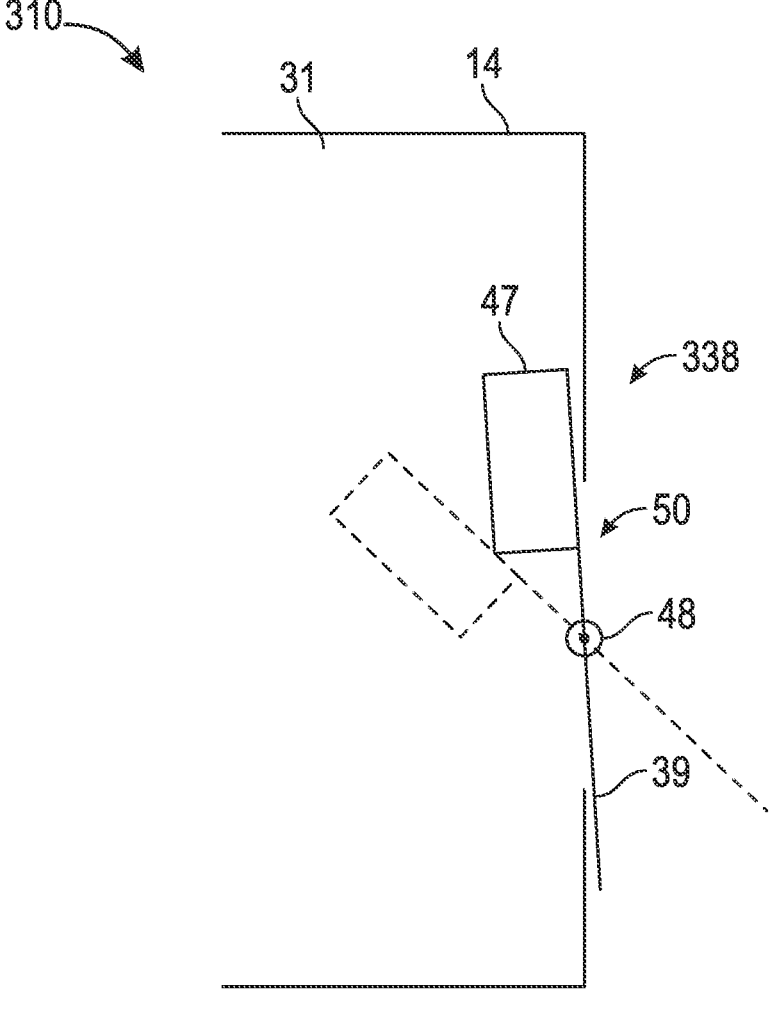
FIG. 3 illustrates a portion of an APC with a bypass mechanism according to various embodiments.

FIG. 3 illustrates a portion of an APC 310 with a bypass mechanism 338 according to various embodiments. The APC 310 is similar to the APC 10 and includes the body 14 having the interior 31 and the bypass opening 50.

The bypass mechanism 338 is similar to the bypass mechanism 38 and includes the blocking device 39 and the positioning mechanism 47. Similar to the bypass mechanism 38, the positioning mechanism 47 is a float in FIG. 3. Compared to the bypass mechanism 38, the bypass mechanism 338 also includes a biasing member 48 connected to the blocking device 39 and biasing the blocking device 39. In the embodiment illustrated, the biasing member 48 biases the blocking device 39 towards the second (open) position (as shown by the dashed lines); although in other embodiments, it may bias the blocking device 39 towards the first (closed) position. The biasing member 48 may be various suitable devices or mechanisms for biasing the blocking device 39. In the embodiment illustrated, the biasing member 48 is a torsion spring.

Similar to the bypass mechanisms 38 and 238, the bypass mechanism 338 with the positioning mechanism 47 and the biasing member 48 may open or close the bypass opening 50. In certain embodiments, when the pump of the APC 310 is operational and/or the body 14 is generally horizontal, pressure within the body 14 exceeds the force provided by the biasing member 48, closing the bypass mechanism 338 (as shown by the solid lines of FIG. 3). By contrast, when the body 14 is generally vertical, the positioning mechanism 47 may travel upward (e.g., because the float is buoyant) and/or is aided by force of the biasing member 48, thus opening the bypass mechanism 38 so that water can flow into the body 14 through the opening 50.

Figure 4:
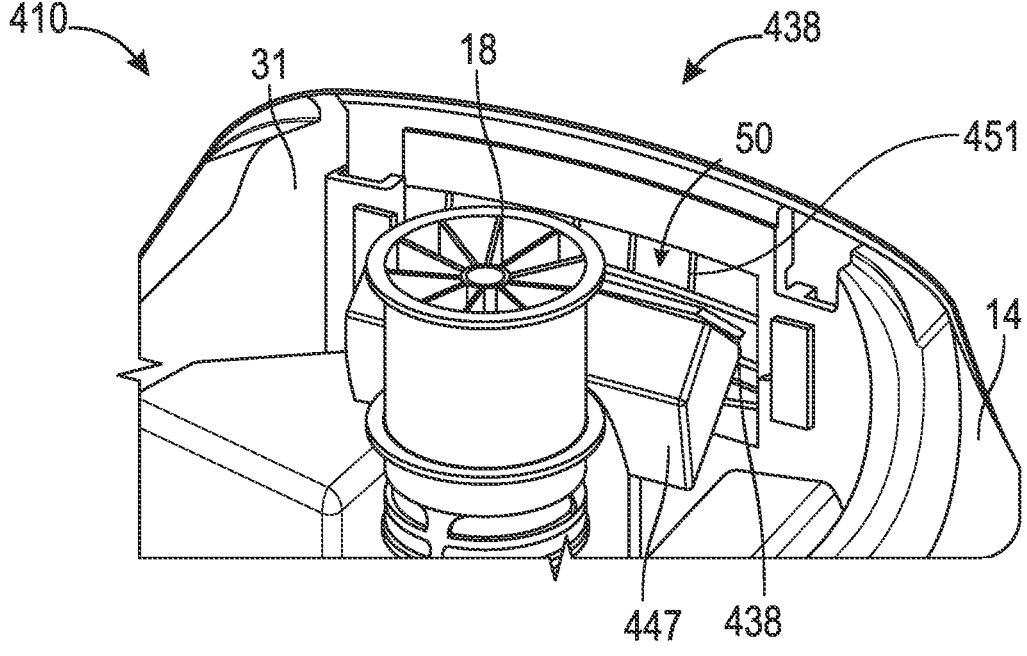
FIG. 4 illustrates a portion of an APC with a bypass mechanism according to various embodiments.

FIG. 4 illustrates another example of an APC 410 having a biasing mechanism 438 according to various embodiments. The APC 410 is similar to the APC 10 except that the shape of the body 14 of the APC 410 has a different profile, and the bypass opening 50 includes a grate cover 451. The biasing mechanism 438 is similar to the biasing mechanism 38 and includes a blocking device 439 that is movable relative to the body 14 to selectively close or open the bypass opening 50, and a positioning mechanism 447 supported on the blocking device 439. The blocking device 439 is similar to the blocking device 39 except for its shape and profile, and the positioning mechanism 447 is similar to the positioning mechanism 47 and is a float; however, the shape and profile of the float as the positioning mechanism 447 is different compared to the positioning mechanism 47.

As previously mentioned, in certain aspects an APC can control a position of the bypass mechanism by directly controlling the bypass mechanism or indirectly controlling the bypass mechanism. As one non-limiting example, a controller may be communicatively coupled with an actuation mechanism mechanically connected to the bypass mechanism and may send a control signal, thereby causing the bypass mechanism to open or close. In other examples, the APC may control the bypass mechanism by controlling a motor of the APC, the pump of the APC, and/or as otherwise desired. As a non-limiting example, the APC may control the bypass mechanism by controlling at least one aspect of power supplied to the pump of the APC by controlling a pattern, duration, strength, etc. Activation of the bypass mechanism may, for example, be controlled by varying modulation of the pulse width (PWM) of the power signal to the pump, although persons skilled in the relevant field will recognize that varying motor speeds or other variables could be utilized instead. Control of the bypass mechanism opening and/or closing by managing the pump power and/or other variable of the APC as desired may ensure that the bypass mechanism is in a desired position regardless of the operating conditions of the APC (e.g., filter clogging level, pump flow, body tightness, cleaner orientation, etc.).

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. An automatic swimming pool cleaner comprising a bypass mechanism that opens or closes based on (1) whether the automatic swimming pool cleaner is, or is not, attempting to climb a generally vertical surface of a pool and (2) whether the pump of the automatic swimming pool cleaner is, or is not, operating.

Illustration 2. An automatic swimming pool cleaner comprising (i) a body having an inlet, an outlet, and a bypass opening, and (ii) a bypass mechanism comprising a positioning mechanism, including but not limited to a float, and configured to open and close the bypass opening base, at least in part, on an orientation of the body.

Illustration 3. An automatic swimming pool cleaner comprising (i) a body defining a water inlet, a water outlet, and a bypass opening, (ii) motive elements, (iii) a filter positioned at least partially in the body, (iv) a pump positioned at least partially in the body, and (v) a bypass mechanism (a) comprising a positioning mechanism, including but not limited to a float, a weight, a spring, a magnet, or otherwise desired, connected to a torsion spring and (b) moveable between a first position closing the bypass opening and a second position opening the bypass opening, with the orientation of the body and the operational status of the pump determining whether the bypass mechanism is in the first position or the second position.

Illustration 4. An automatic swimming pool cleaner of any preceding or subsequent illustration or combination of illustrations in which the bypass mechanism is controlled by managing at least one aspect of power supplied to the pump of the APC.

Illustration 5. A method of extracting an automatic swimming pool cleaner from a swimming pool, the method comprising (i) causing the automatic swimming pool cleaner to climb a generally vertical wall of the swimming pool toward its waterline, thereby opening a bypass opening in a body of the automatic swimming pool cleaner, and (ii) causing the de-energization of a pump of the automatic swimming pool cleaner with the bypass opening remaining open so as to allow water within the body to drain therefrom.

Illustration 6. A method according of any preceding or subsequent illustration or combination of illustrations in which the action of opening a bypass water inlet is controlled by managing at least one aspect of power supplied to the pump of the APC.

Illustration 7. An automatic swimming pool cleaner comprising: a bypass opening for a fluid; and a bypass mechanism configured to selectively open or close the bypass opening based on an orientation of the automatic swimming pool cleaner and based on an operational status of a pump of the automatic swimming pool cleaner.

Illustration 8. The automatic swimming pool cleaner of any preceding or subsequent illustration or combination of illustrations, further comprising: a body comprising an interior, a fluid inlet, a fluid outlet, and the bypass opening; and the pump at least partially within the interior of the body.

Illustration 9. The automatic swimming pool cleaner of any preceding or subsequent illustration or combination of illustrations, wherein a main fluid flow path is defined from the fluid inlet to the fluid outlet, and wherein, when the bypass opening is open, a bypass fluid flow path extends from the bypass opening and joins the main fluid flow path within the body.

Illustration 10. The automatic swimming pool cleaner of any preceding or subsequent illustration or combination of illustrations, further comprising a filter at least partially within the interior of the body, and wherein the bypass fluid flow path bypasses the filter.

Illustration 11. The automatic swimming pool cleaner of any preceding or subsequent illustration or combination of illustrations, wherein the bypass mechanism is configured to open the bypass opening based on at least one of the pump being de-energized or the orientation of the automatic swimming pool cleaner being substantially vertical.

Illustration 12. The automatic swimming pool cleaner of any preceding or subsequent illustration or combination of illustrations, wherein the bypass mechanism is configured to close the bypass opening based on at least one of the pump being energized or the orientation of the automatic swimming pool cleaner being substantially horizontal.

Illustration 13. The automatic swimming pool cleaner of any preceding or subsequent illustration or combination of illustrations, wherein the bypass mechanism comprises a biasing member, a blocking device connected to the biasing member, and a positioning mechanism connected to the blocking devices, wherein the positioning mechanism comprises a float, and wherein the blocking device is movable relative to the bypass opening between a first position closing the bypass opening and a second position opening the bypass opening.

Illustration 14. The automatic swimming pool cleaner of any preceding or subsequent illustration or combination of illustrations, wherein the biasing member biases the blocking device towards the second position.

Illustration 14a. The automatic swimming pool cleaner of any preceding or subsequent illustration or combination of illustrations, wherein the bypass opening is a drainage outlet for the fluid from an interior of the automatic swimming pool cleaner.

Illustration 15. An automatic swimming pool cleaner comprising: a body comprising a fluid inlet, a fluid outlet, and a bypass opening; and a bypass mechanism comprising a positioning mechanism, wherein the positioning mechanism optionally comprises a float, wherein the bypass mechanism is configured to open and close the bypass opening based on an orientation of the body.

Illustration 16. The automatic swimming pool cleaner of any preceding or subsequent illustration or combination of illustrations, wherein the bypass mechanism is configured to open the bypass opening based on the orientation of the body being substantially vertical.

Illustration 17. The automatic swimming pool cleaner of any preceding or subsequent illustration or combination of illustrations, wherein the bypass mechanism is configured to close the bypass opening based on the orientation of the body being substantially horizontal.

Illustration 18. The automatic swimming pool cleaner of any preceding or subsequent illustration or combination of illustrations, wherein a main fluid flow path is defined from the fluid inlet to the fluid outlet, and wherein, when the bypass opening is open, a bypass fluid flow path extends from the bypass opening and joins the main fluid flow path within the body.

Illustration 19. The automatic swimming pool cleaner of any preceding or subsequent illustration or combination of illustrations, further comprising a filter at least partially within the interior of the body, and wherein the bypass fluid flow path bypasses the filter.

Illustration 20. The automatic swimming pool cleaner of any preceding or subsequent illustration or combination of illustrations, wherein the bypass mechanism further comprises a biasing member and a blocking device connected to the biasing member, wherein the float is connected to the blocking device, and wherein the blocking device is movable relative to the bypass opening between a first position closing the bypass opening and a second position opening the bypass opening.

Illustration 21. The automatic swimming pool cleaner of any preceding or subsequent illustration or combination of illustrations, further comprising motive elements, a filter positioned at least partially in the body, and a pump positioned at least partially in the body.

Illustration 21a. The automatic swimming pool cleaner of any preceding or subsequent illustration or combination of illustrations, wherein the bypass opening is a drainage outlet for a fluid from an interior of the automatic swimming pool cleaner such that the fluid is exhausted through both the bypass opening and the fluid outlet.

Illustration 22. An automatic swimming pool cleaner comprising: a body comprising a fluid inlet, a fluid outlet, and a bypass opening; a pump positioned at least partially in the body; and a bypass mechanism comprising a positioning mechanism and configured to open and close the bypass opening based on an operational status of the pump.

Illustration 23. The automatic swimming pool cleaner of any preceding or subsequent illustration or combination of illustrations, wherein the bypass mechanism is further configured to open and close the bypass opening based on an orientation of the body.

Illustration 24. The automatic swimming pool cleaner of any preceding or subsequent illustration or combination of illustrations, further comprising at least one motive element and a filter positioned at least partially in the body.

Illustration 25. The automatic swimming pool cleaner of any preceding or subsequent illustration or combination of illustrations, wherein the positioning mechanism comprises a float, wherein the bypass mechanism comprises a biasing member and a blocking device connected to the biasing member, and wherein the blocking device is movable relative to the bypass opening between a first position closing the bypass opening and a second position opening the bypass opening.

Illustration 26. The automatic swimming pool cleaner of any preceding or subsequent illustration or combination of illustrations, wherein the biasing member biases the blocking device towards the second position.

Illustration 27. The automatic swimming pool cleaner of any preceding or subsequent illustration or combination of illustrations, wherein the biasing member comprises a torsion spring.

Illustration 28. The automatic swimming pool cleaner of any preceding or subsequent illustration or combination of illustrations, wherein a main fluid flow path is defined from the fluid inlet to the fluid outlet, and wherein, when the bypass opening is open, a bypass fluid flow path extends from the bypass opening and joins the main fluid flow path within the body.

Illustration 29. The automatic swimming pool cleaner of any preceding or subsequent illustration or combination of illustrations, further comprising a filter at least partially within the interior of the body, and wherein the bypass fluid flow path bypasses the filter.

Illustration 30. The automatic swimming pool cleaner of any preceding or subsequent illustration or combination of illustrations, wherein the bypass opening is a drainage outlet for a fluid from an interior of the automatic swimming pool cleaner such that the fluid is exhausted through both the bypass opening and the fluid outlet.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are included herein within the scope of the present disclosure, and all possible claims to individual aspects or combinations of elements or steps are intended to be supported by the present disclosure. For avoidance of doubt, any combination of features not physically impossible or expressly identified as non-combinable herein may be within the scope of the invention. Further, although applicant has described devices and techniques for use principally with APCs, persons skilled in the relevant filed will recognize that the present invention conceivably could be employed in connection with other objects and in other manners. Moreover, although specific terms are employed herein, as well as in the claims that follow, they are used only in a generic and descriptive sense, and not for the purposes of limiting the described invention, nor the claims that follow.

That which is claimed is:

1. An automatic swimming pool cleaner comprising:
a body comprising a bottom end, a front end, and a back end opposite the front end;
motive elements configured to move the body in a direction of the front end;
a pump disposed within the body of the automatic swimming pool cleaner;
a bypass opening for a fluid on the back end of the body of the automatic swimming pool cleaner; and
a bypass mechanism configured to selectively close the bypass opening when the cleaner is in a substantially horizontal orientation and the pump is in an energized operational status and open the bypass opening when the front end of the cleaner is facing a substantially vertical orientation,
wherein the bypass mechanism comprises a biasing member and a blocking device connected to the biasing member, wherein the blocking device is movable relative to the bypass opening based on a change in position of the automatic swimming pool cleaner and the biasing member biases the blocking device to an open position.

2. The automatic swimming pool cleaner of claim 1, further comprising
the body comprising an interior, a fluid inlet, a fluid outlet, and the bypass opening,
wherein a main fluid flow path is defined from the fluid inlet to the fluid outlet, and wherein,
when the bypass opening is open, a bypass fluid flow path extends from the bypass opening and joins the main fluid flow path within the body.

3. The automatic swimming pool cleaner of claim 2, further comprising a filter at least partially within the interior of the body, and wherein the bypass fluid flow path bypasses the filter.

4. The automatic swimming pool cleaner of claim 1, wherein the bypass mechanism is controlled by managing at least one aspect of power supplied to the pump of the automatic swimming pool cleaner.

5. The automatic swimming pool cleaner of claim 1, wherein the bypass mechanism is configured to open the bypass opening based on the pump being de-energized.

6. The automatic swimming pool cleaner of claim 1, wherein the bypass mechanism comprises a positioning mechanism connected to the blocking device.

7. The automatic swimming pool cleaner of claim 1, wherein the bypass opening is a drainage outlet for the fluid from an interior of the automatic swimming pool cleaner.

8. An automatic swimming pool cleaner comprising:
a body comprising a fluid inlet, a fluid outlet, and a bypass opening, wherein the fluid inlet is on a first side of the automatic swimming pool cleaner and the bypass opening is on a second side of the automatic swimming pool cleaner different from the first side; and
a bypass mechanism comprising a buoyant float, a biasing member, and a blocking device connected to the biasing member and connected to the buoyant float, wherein the buoyant float is configured to bias the blocking device toward an open position when the body is in a substantially vertical orientation, and wherein the biasing member is configured to bias the blocking device toward the open position, such that an opening force by the biasing member is overcome by a combined closing force generated by the buoyant float and pump suction when the body is in a substantially horizontal orientation.

9. The automatic swimming pool cleaner of claim 8, wherein the bypass mechanism is configured to open the bypass opening based on an orientation of the body being substantially vertical.

10. The automatic swimming pool cleaner of claim 9, wherein the bypass mechanism is configured to close the bypass opening based an the orientation of the body being substantially horizontal.

11. The automatic swimming pool cleaner of claim 8, wherein a main fluid flow path is defined from the fluid inlet to the fluid outlet, and wherein, when the bypass opening is open, a bypass fluid flow path extends from the bypass opening and joins the main fluid flow path within the body.

12. The automatic swimming pool cleaner of claim 11, further comprising a filter at least partially within an interior of the body, and wherein the bypass fluid flow path bypasses the filter.

13. The automatic swimming pool cleaner of claim 8, further comprising (i) motive elements, (ii) a filter positioned at least partially in the body, and (iii) a pump positioned at least partially in the body.

14. The automatic swimming pool cleaner of claim 8, wherein the bypass opening is a drainage outlet for a fluid from an interior of the automatic swimming pool cleaner such that the fluid is exhausted through both the bypass opening and the fluid outlet.

15. An automatic swimming pool cleaner comprising:

a body comprising a fluid inlet, a fluid outlet, and a bypass opening, wherein the fluid outlet is on a top end of the automatic swimming pool cleaner and the bypass opening is on a back end of the automatic swimming pool cleaner:

a pump positioned at least partially in the body; and a bypass mechanism comprising a biasing member, a blocking device connected to the biasing member and pivotable relative to the bypass opening, and a positioning mechanism connected to the blocking device, the positioning mechanism separate from the biasing member and configured to open and close the bypass opening based on an operational status of the pump and based on an orientation of the body, the biasing member biasing the blocking device to an open position, wherein, in a vertical orientation of the body, the bypass opening forms a second fluid inlet configured to intake water from outside the body when the pump is in an energized operational status and forms a second fluid outlet configured to expel water from the body when the pump is in a de-energized operational status.

16. The automatic swimming pool cleaner of claim 15, further comprising (i) at least one motive element and (ii) a filter positioned at least partially in the body.

17. The automatic swimming pool cleaner of claim 15, wherein the bypass mechanism is controlled by managing at least one aspect of power supplied to the pump of the automatic swimming pool cleaner.

18. The automatic swimming pool cleaner of claim 15, wherein a main fluid flow path is defined from the fluid inlet to the fluid outlet, and wherein, when the bypass opening is open, a bypass fluid flow path extends from the bypass opening and joins the main fluid flow path within the body.

19. The automatic swimming pool cleaner of claim 18, further comprising a filter at least partially within an interior of the body, and wherein the bypass fluid flow path bypasses the filter.

20. The automatic swimming pool cleaner of claim 15, wherein the bypass opening is a drainage outlet for a fluid from an interior of the automatic swimming pool cleaner such that the fluid is exhausted through both the bypass opening and the fluid outlet.

* * * * *